(12) United States Patent
Sharp

(10) Patent No.: US 6,856,259 B1
(45) Date of Patent: Feb. 15, 2005

(54) TOUCH SENSOR SYSTEM TO DETECT MULTIPLE TOUCH EVENTS

(75) Inventor: Jeffrey L. Sharp, Newark, CA (US)

(73) Assignee: Elo Touchsystems, Inc., Menlo Park, CA (US)

( * ) Notice: Subject to any disclaimer, the term of this patent is extended or adjusted under 35 U.S.C. 154(b) by 0 days.

(21) Appl. No.: 10/773,611

(22) Filed: Feb. 6, 2004

(51) Int. Cl.[7] .............................................. H03M 1/22
(52) U.S. Cl. ..................................... 341/5; 178/18.01
(58) Field of Search .......................... 341/5; 178/18.01, 178/18.05, 18.04; 345/173

(56) References Cited

U.S. PATENT DOCUMENTS

| | | | | |
|---|---|---|---|---|
| 4,644,100 A | | 2/1987 | Brenner et al. .......... | 178/18.04 |
| 4,782,328 A | * | 11/1988 | Denlinger ...................... | 341/5 |
| 5,451,724 A | * | 9/1995 | Nakazawa et al. ....... | 178/18.05 |
| 5,825,352 A | | 10/1998 | Bissett et al. ............... | 345/173 |
| 5,854,450 A | | 12/1998 | Kent ........................ | 178/18.04 |
| 5,896,126 A | | 4/1999 | Shieh .......................... | 345/173 |
| 5,943,043 A | | 8/1999 | Furuhata et al. ............ | 345/173 |
| 5,986,224 A | | 11/1999 | Kent ........................ | 178/18.04 |
| 6,023,265 A | | 2/2000 | Lee ............................ | 345/173 |
| 6,229,529 B1 | | 5/2001 | Yano et al. .................. | 345/175 |
| 6,723,929 B2 | | 4/2004 | Kent ........................ | 178/18.04 |
| 6,777,922 B2 | * | 8/2004 | Tajima et al. ............. | 324/76.75 |
| 2003/0063073 A1 | | 4/2003 | Geaghan et al. .............. | 345/73 |

* cited by examiner

*Primary Examiner*—Peguy JeanPierre

(57) ABSTRACT

Touch input systems for use with information display systems and methods distinguishing multiple touches overlapping in time. The touch input systems and methods analyze and optimize data collected on the X axis over time independently from that collected on the Y axis, and for each (X, Y) pair corresponding to a potential touch location, calculate correlation values between X magnitudes and Y magnitudes. The touch input system determines valid touch locations based on the correlation values. Because the touch input systems and methods of the present invention can process multiple concurrent touches, they can be used in applications for multiple users, such as games, and in other applications requiring the processing of concurrent touch inputs.

26 Claims, 6 Drawing Sheets

First Sampling Period

Second Sampling Period

Time ⟶

First Sampling Period

Second Sampling Period

Time ⟶

TOUCH SENSOR SYSTEM TO DETECT MULTIPLE TOUCH EVENTS

FIELD OF THE INVENTION

This invention relates to a touch input system for use with an information display system. More particularly, the present invention is directed to touch input systems in which there can be multiple touches overlapping in time and to methods for distinguishing multiple touch inputs.

INTRODUCTION TO THE INVENTION

Touch input systems have become ubiquitous throughout industrialized countries. These systems have replaced or supplemented conventional input systems, such as a keyboard or mouse in many applications, including for example, information kiosks, retail point of sale, order input, e.g. restaurants, and industrial line operations. Various sensing technologies are applied in touch input systems currently in the marketplace, including acoustic, resistive, capacitive and infrared. A touch input system is typically used in conjunction with some type of information display system that may include a computer. When a user touches a displayed object, the touch input system communicates the location of the touch to the system.

FIGS. 1 and 2 show conventional touch sensor systems and touch point input systems. The touch sensor system 100 generally comprises a touchscreen 105 (e.g., a touch sensor having a transparent substrate), a controller 110, and a lead 111 coupling the controller 110 to the touchscreen 105. A touchscreen system comprising the touchscreen 105 and controller 110, may be used in conjunction with a display device 115. The touchscreen system 100 is configured to respond to a touch on the touchscreen 105 by causing acoustic waves to be transmitted across the touchscreen 105, one or more of which are modulated in the presence of the touch. The controller 110 in turn uses the modulated signal from the waves to identify the location of the touch on the touchscreen 105. The controller 110 also uses the modulated signal to distinguish between valid touches and invalid signals (e.g., signals generated by contamination on the surface of the screen). If the controller 110 identifies a touch as valid, it transmits the touch's location to a host computer (not shown) that then implements a corresponding computer function to display the pertinent information, e.g., graphics, on the display device 115. Graphics or other information may be displayed on the display device 115 in response to an operator's command, e.g. touching a particular area of the touchscreen 105. Such a system is described in U.S. Pat. No. 5,854,450, the disclosure of which is incorporated herein by reference.

An acoustic wave touch input system is illustrated in FIG. 2, and has a transparent sensor substrate 120 covering a screen of a display system, the substrate having a surface 122. The transparent sensor substrate is typically made of glass. The wave energy is directed along one or more paths that form an invisible XY grid overlaying the substrate surface 122 wherein a touch to the surface causes wave energy to be attenuated. A first transmitting transducer 125 and a first receiving transducer 135 are provided in two corners of the substrate, with the corners being located on a first vertical side of the substrate. The first transmitting transducer 125 transmits acoustic waves in the horizontal right direction to be received by transducer 135. A second transmitting transducer 130 and a second receiving transducer 140 are oriented perpendicularly to the first transmitting and receiving transducers on a first horizontal side of the substrate. Both the transmitting transducers 125 and 130 and the receiving transducers 135 and 140 may be, for example, piezoelectric transducers. Two reflector arrays 200 and 205 are provided on both horizontal sides of the substrate, and two reflector arrays 210 and 215 are provided on both vertical sides of the substrate. The reflector arrays partially reflect waves from the transmitting transducers to the receivers. The controller sends signals to the transmitting transducers through lines 160 and 165, and the transmitter transducers generate acoustic energy that is launched across the substrate and reflected by the reflectors. The controller accepts signals from the receiving transducers through lines 190 and 195, and the received signals include timing and signal amplitude. The controller comprises coded instructions (stored, for example, in a memory of a microprocessor), which when executed, perform steps to control and process the relevant signals. The controller need not comprise a computer, but can be totally implemented in hardware or firmware. The time the wave takes to travel from the transmitting transducers 125 and 135 to the receiving transducers 130 and 140 via the reflectors 200, 205, 210 and 215 is dependent on the path length, and therefore the position of an attenuation within the wave can be correlated to the time at which it was received relative to the time it was launched. Waves are periodically and repetitively propagated in both the X- and Y-directions of the substrate in order to allow the detection of coordinates of a touch point 250. The time between the repetitive propagation of waves is the sampling time. Further details on the use of this architecture to determine the positional coordinates of touches on a touchscreen are described in U.S. Pat. No. 4,644,100, which is incorporated herein by reference.

One disadvantage of touch input systems incorporating the propagation and detection of acoustic waves is that if two or more points are pressed or touched concurrently or within a specific same sampling period of the system, the receiving transducers will detect multiple X-coordinates and multiple Y-coordinates within a single time interval in which the coordinates are read, and as such the touch location may be identified by multiple distinct coordinate pairs. This is illustrated in FIG. 3 for the case of two concurrent touch events indicated at locations 250 and 251. In the example shown in FIG. 3, there are two possible combinations of X and Y pairs to form two possible coordinate combinations, which could indicate touch locations 252 and 253, which are not the actual touch locations. Therefore, for applications that demand the capability to sense multiple concurrent touches, improvements over conventional systems are needed.

In some cases, multiple touches that overlap in time occur as sequential events. Sequential touches occur when two touch events start at different times and remain on the screen together for a period of time. In this situation, one touch can be detected as having occurred first, and the first touch is sustained through the start of a second touch. FIG. 4 shows how the greater likelihood of certain events determines the best choice of actual coordinates. In FIG. 4, a first touch occurs at (X1, Y1) in one measurement period and extends into a later second measurement period. A second touch starts at location (X2, Y2) in the second measurement period. Since the system will detect that there are coordinates at X1, Y1, X2, and Y2, there are two possible pairs of coordinates the system could arrive at: the touches could have occurred at (X1, Y1) and (X2, Y2) which is illustrated in FIG. 4A; or the touches could have occurred at (X1, Y2) and (X2, Y1) which is illustrated in FIG. 4B. However, for the latter situation to have occurred, several unlikely events must have happened in the short period of time between samples (e.g., less than 0.01 seconds if the controller samples at a rate of 100 times per second). These events include: the first touch registered at (X1, Y1) must have changed either its X or Y coordinate in less than the time between measurement periods (e.g., a single sampling period); the first touch must have been similar in intensity (i.e., led to a similar level of signal) to the second touch, and; the second touch must have been in line (i.e., maintained the same coordinate within the resolution of the system) with the first touch on one axis. Thus, the more likely pairing, (X1, Y1) and (X2, Y2), is chosen. U.S. Pat. No. 6,229,529, which is incorporated herein by reference, describes the use of the calculations that rely on the greater likelihood that two coordinates of an actual touch will be detected at times that are close to each other to determine coordinates of actual touches when multiple concurrent touches occur.

In other cases, multiple touches that overlap in time occur as simultaneous events. Simultaneous touches occur when the start times for two touches are the same within the time resolution of the system (e.g., the time resolution of the microchip controller of the system). Features of the system that can limit time resolution include analog to digital sampling rate, wave propagation velocity, bandwidth of analog circuits, etc. For example, if the controller samples the screen at a rate of 100 times per second, then touches arriving within 0.01 second of each another cannot be resolved in time. In some applications, it is likely that two touches will occur somewhere in the screen within 0.01 seconds. For example, in a video game involving head-to-head competition, this probability may be very high.

U.S. Pat. No. 5,854,450 (already incorporated herein by reference) describes the matching of signal amplitudes between possible X and Y coordinate pairs to identify actual touch locations when multiple touches are detected simultaneously. U.S. Patent Application Publication No. 2003/0063073, which is incorporated herein by reference, discloses systems and methods for identifying temporally overlapping touch events by using a predetermined number of measurements to compare signal magnitudes to predetermined threshold levels, comparing rates of change of signal magnitudes or location information, comparing the proximity of positional data to identified areas of the screen such as icons, and determining whether an apparent touch is detected in a region where double touch events have a higher probability of occurring.

BRIEF SUMMARY OF THE INVENTION

The present invention provides touch input systems and methods for identifying coordinates of multiple touches that overlap in time, and touch systems capable of distinguishing multiple touches. Concurrent multiple touches can occur, for example, when two users touch the sensor during the same time interval or when a single user touches the sensor more than once during the same time interval. After identifying coordinate pairs associated with concurrent multiple touch events, valid touch point locations can be reported to the system and processed.

Methods of the present invention may be used with various touch sensor technologies, for example, acoustic wave (e.g., surface acoustic wave), capacitive, resistive, infrared and force sensing. Because the nature of the touch input signal varies between the different technologies, the details of the implementations of the methods may vary. However, many aspects of the present invention may be used in touchscreen systems using various sensor technologies.

In a first aspect, the present invention provides a method for identifying locations of two or more touch inputs that overlap in time to a sensor substrate of a touchscreen system, the substrate having X and Y axes. The method includes repeatedly measuring signals indicative of locations of the multiple touch inputs, the locations having X and Y coordinates, and the signals having X signal magnitudes associated with each X coordinate and Y signal magnitudes associated with each Y coordinate. For each X coordinate and each Y coordinate, the method includes storing the associated X signal magnitude measured for each repeated measurement as elements in an X software object and storing the associated Y signal magnitude measured for each repeated measurement as elements in a Y software object. The method further includes comparing elements of X objects with elements of Y objects, and selecting (X, Y) pairings corresponding to actual touch locations from the possible pairings based on the comparison between these elements.

In a second aspect, this invention provides a touch input system including a touch point sensor having an X axis and a Y axis, wherein a pair of coordinates composed of one X coordinate and one Y coordinate defines a location. The touch input system also includes a location determining apparatus for determining the locations of touch points overlapping in a time period, including a detecting means for repeatedly detecting touch signals corresponding to X and Y coordinates and having X and Y signal characteristics associated with the coordinates. The touch input system also includes a storing means for storing the X signal characteristics associated with each X coordinate as elements in an X object and for storing the Y signal characteristics associated with each Y coordinate as elements in a Y object. The system includes a first comparison means for comparing X objects to Y objects associated with possible pairings of X and Y coordinates. The system includes a selection means for selecting pairings of X and Y coordinates corresponding to actual touch point locations based on the comparison between the X objects and the Y objects associated with the pairings.

In a third aspect, the invention provides a system including a touch panel input device having a touch panel sensor having an X axis and a Y axis for indicating actual touch point locations on the sensor. The system includes a signal detector operating for a succession of time intervals to detect an X signal comprising X signal characteristics and an associated X coordinate and a Y signal comprising Y signal characteristics and an associated Y coordinate for each actual touch point on the sensor, wherein more than one X signal or more than one Y signal are detected during a single time interval. The system includes a selector for processing the X signals and the Y signals separately from each other to select pairs of coordinates corresponding to locations of actual touch points. The selector selects the pairs of coordinates based on a correlation value between the X signal characteristics associated with the X coordinate of a pair and the Y signal characteristics associated with the Y coordinate of the same pair.

BRIEF DESCRIPTION OF THE DRAWINGS

This invention and other objects, advantages, aspects and features of the present invention will be more fully understood and appreciated upon consideration of the detailed description of preferred embodiments presented in conjunction with the following drawings.

DETAILED DESCRIPTION OF THE INVENTION

Figure 1:
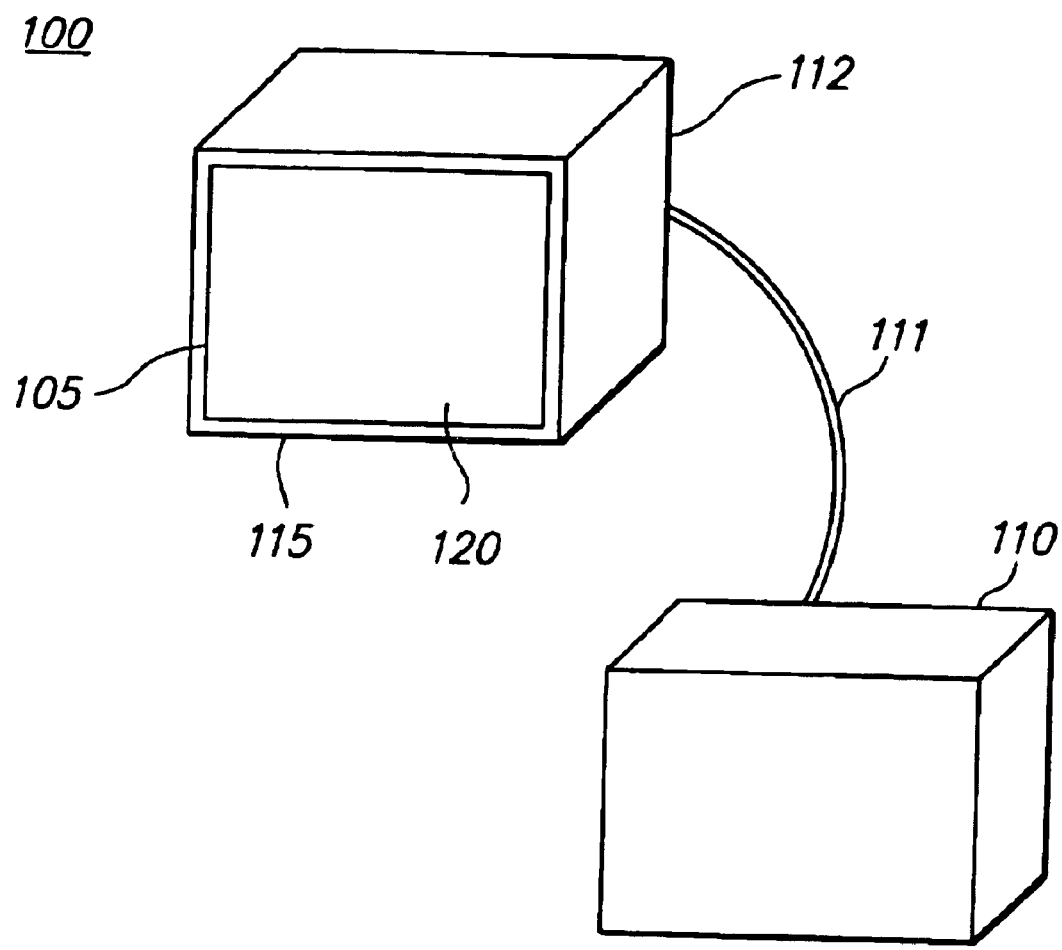
FIG. 1 is a perspective view of a conventional touch sensor system.
Figure 2:
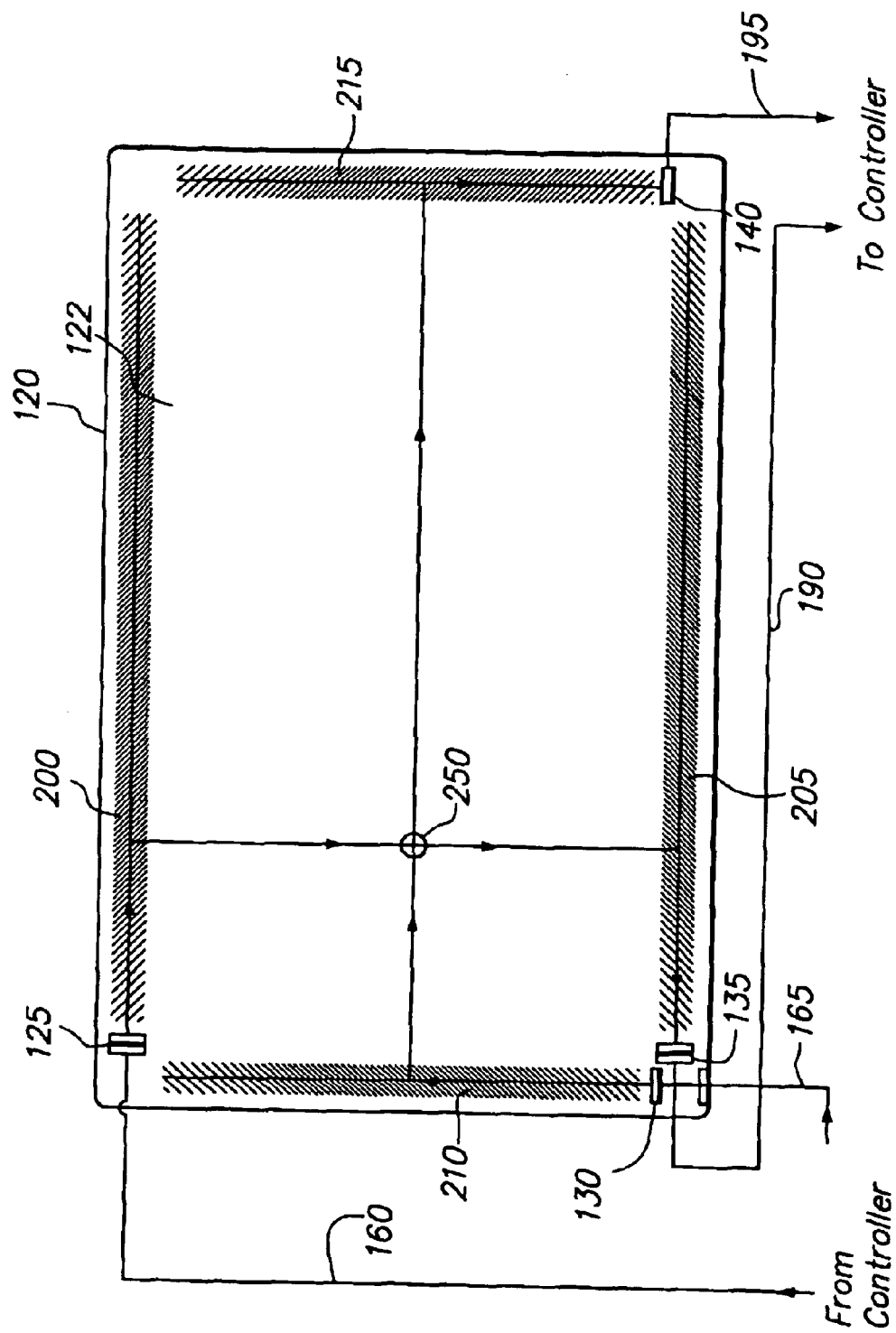
FIG. 2 is a planar, schematic view of a conventional touch input system.
Figure 3:
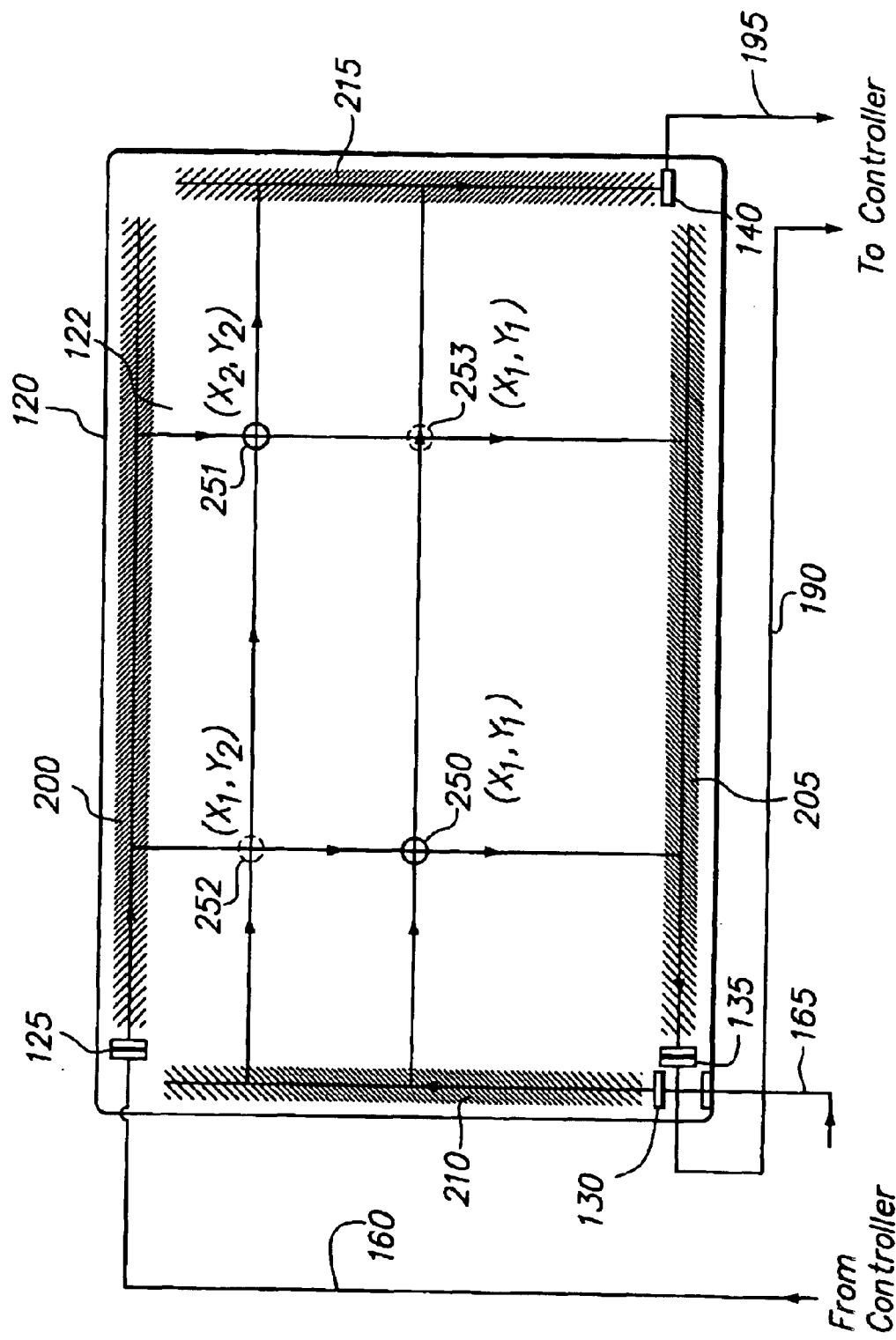
FIG. 3 is a schematic view of a touch input system showing two concurrent touch events.
Figure 4A:
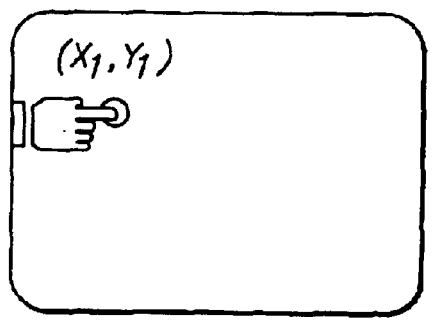
FIG. 4 is a schematic view illustrating two sequential simultaneous touch points.
Figure 4A:
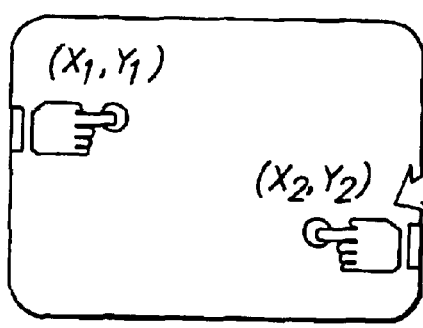
Figure 4B:
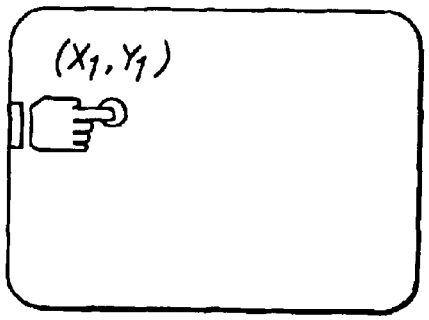
Figure 4B:
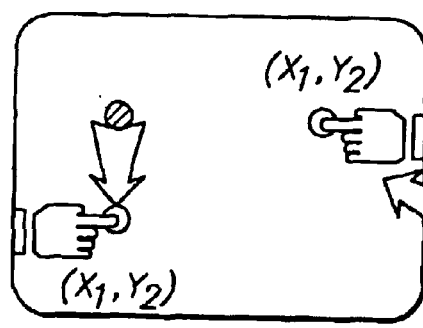

To address the problem of properly assigning location coordinates for multiple touches overlapping in time, e.g., concurrent or simultaneous touches, we describe here a touch input system that can process information in two phases. The system comprises a touchscreen comprising a touch point sensor substrate having an X axis and a Y axis, transmitting transducers for launching waves along the substrate, receiving transducers for detecting signals corresponding to the waves, a controller for determining the launching of the waves and analyzing the received signals. The controller preferably comprises a microchip, e.g., a microprocessor. The controller can further comprise analog-to-digital converters for digitizing the signals received. The controller can sample the touchscreen with a varying rate, rather than a fixed rate. The microprocessor's workload can affect the time between successive samples, but the time between samples need not be rigorously measured and therefore the sampling rate may vary. As a result, the sequence of samples is time-ordered, but the sequence may not be a clear mathematical function of time.

The controller can process simultaneous touches by analyzing signals detected on each axis (X and Y) separately, and checking for intra-axis consistency in the detected signals over time. The controller can update intra-axis data to ensure consistency of data within an axis, and then compare the data between the two axes. If the inter-axis comparison yields information that would weigh information in either of the two single axis data differently, then that single axis data can be updated to reflect the new information.

The controller can provide separate channels for detecting signals on the X-axis and on the Y-axis. If the two channels are not driven at the same time or in a synchronized fashion, the signals they produce can be considered independently. The processing of concurrent touches can utilize the independence of the signals from each axis by treating the sequence of X touch signal locations independently from the sequence of Y touch signal locations. For each touch point, on each axis, a software object (e.g., a 1-dimensional software object) that persists can be built and maintained from initial touch until untouch. The term object refers to a data item formatted to permit storing a collection of numeric and logical values in microprocessor memory. The creation or use of an object as described here does not require that the microprocessor be programmed using an object-oriented programming language or that the controller should be implemented as a microprocessor running a stored program, however, such approaches may be used. In the invention described herein, an object can provide some or complete continuity of identity for each touched coordinate along each axis over several measurement periods. An object does this by recording how the particular touched coordinate has behaved in recent measurement periods. At each measurement period, new information can be added to each object, and the oldest information can be deleted or overwritten. Thus, the object maintains a running history of axis location and other signal characteristics associated with that location. These objects can preserve their unique identities despite changes (e.g., changes in touch location, brief touch skips, or overlaps and shadowing of touches by nearby touches, especially in that a large touch may shadow a closely positioned smaller touch). The objects comprise elements, which can include parametric data such as coordinate location and associated signal characteristics such as magnitude. The term magnitude is used herein to mean any reasonable measure of touch intensity or signal in the neighborhood of a particular X coordinate or Y coordinate. Magnitude is notated M(U), indicating the "magnitude of quantity U", which can mean a sequence of magnitudes observed in several measurement periods as well as a single value. Some examples of reasonable measures of touch intensity are maximum signal amplitude, summation or integral of several signal amplitudes, and root of summed squares of signal amplitudes, but other measures may also be used to express magnitude. As defined here, magnitude may be either a raw measured value or it may be a mathematical function of one or more measured values. Each object's elements can be updated every time its associated axis is sampled. The elements of the objects can therefore include how a particular touch point is currently being detected (e.g., location and magnitude) and how it has behaved in the recent past.

For example, the sequential values of the location and magnitude of a touch over several recent sampling events can be recorded in the object. Therefore, an object associated with the touch can include the touch's historical location and magnitude, and a new location and magnitude expected in the next sampling event can be predicted based on the historical information. Based on the amount of variation in prior parametric information (e.g., location and magnitude) of a touch, a tolerance for predicted values for these parameters can be estimated. If there are multiple objects associated with coordinates along one axis and the separation distance of the coordinates exceeds the predicted tolerances, then the objects can be updated independently. Each object can also be updated with information from the nearest sampled location, for example, in case a spatial overlap occurs.

Figure 5:
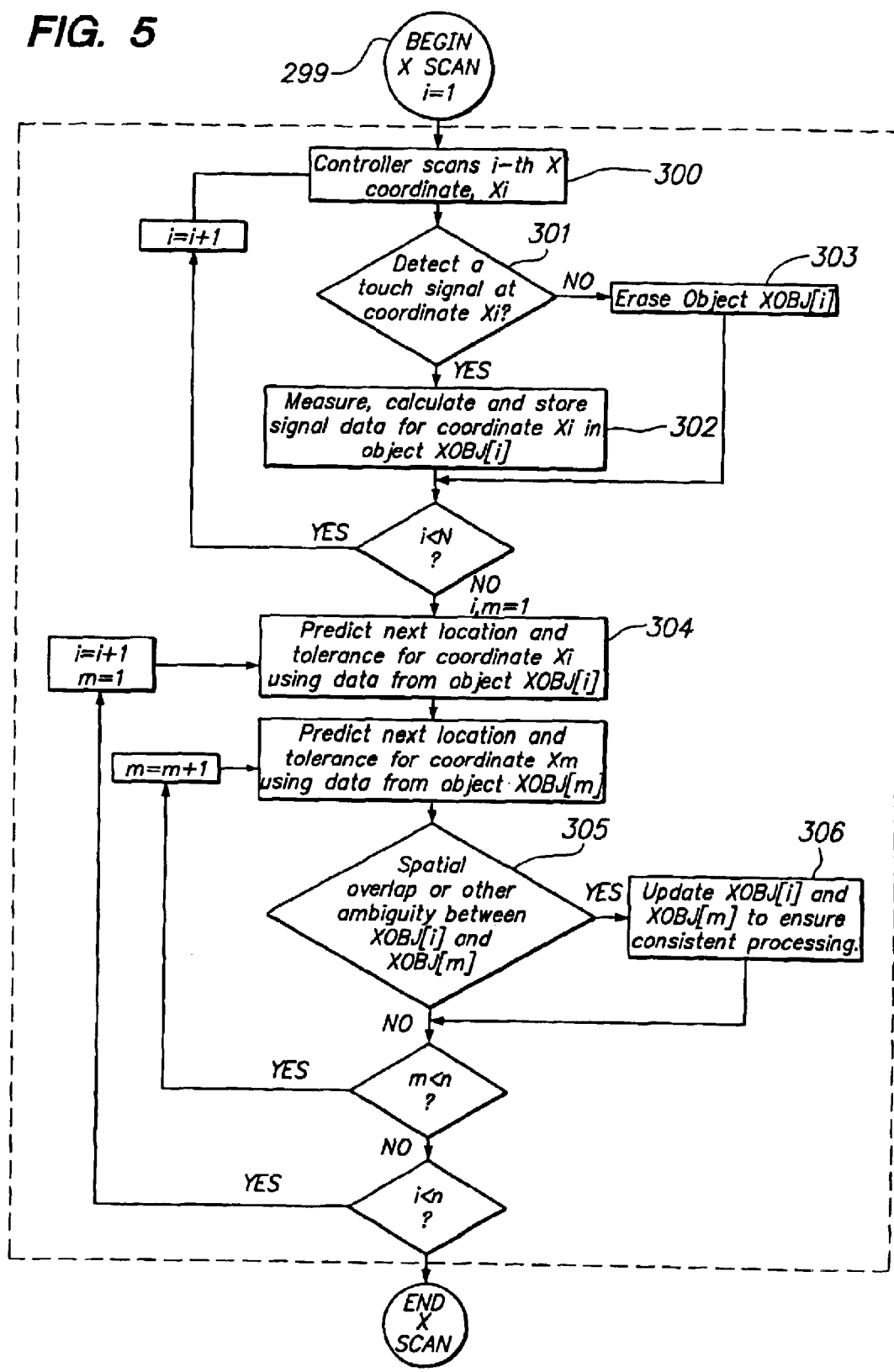
FIG. 5 is a flow chart illustrating a method for analyzing and processing touch point data along a single axis.

FIG. 5 shows a flow chart describing a method for analyzing and processing touch information for a single axis (the X axis is shown). The controller begins a scan sequence to scan all N X-coordinates (299). If, when the $i^{th}$ X-coordinate ($X_i$) is scanned (300), a touch signal is detected (301), the touch signal data including location, signal magnitude and, possibly, other characteristics, are stored as elements of an object XOBJ[i] (302). If no touch is detected at coordinate $X_i$, then any corresponding object XOBJ[i] can be erased (303). Then, based on information stored in the object, a future location and tolerance are calculated (304). The predicted location and tolerance are compared to predictions for all other coordinates, $X_m$, where m is not equal to i (305). Based on this comparison, elements of objects XOBJ[i] and XOBJ[m] may be updated (306). The data for the Y-axis is processed separately and in an analogous manner as shown in FIG. 5.

Figure 6:
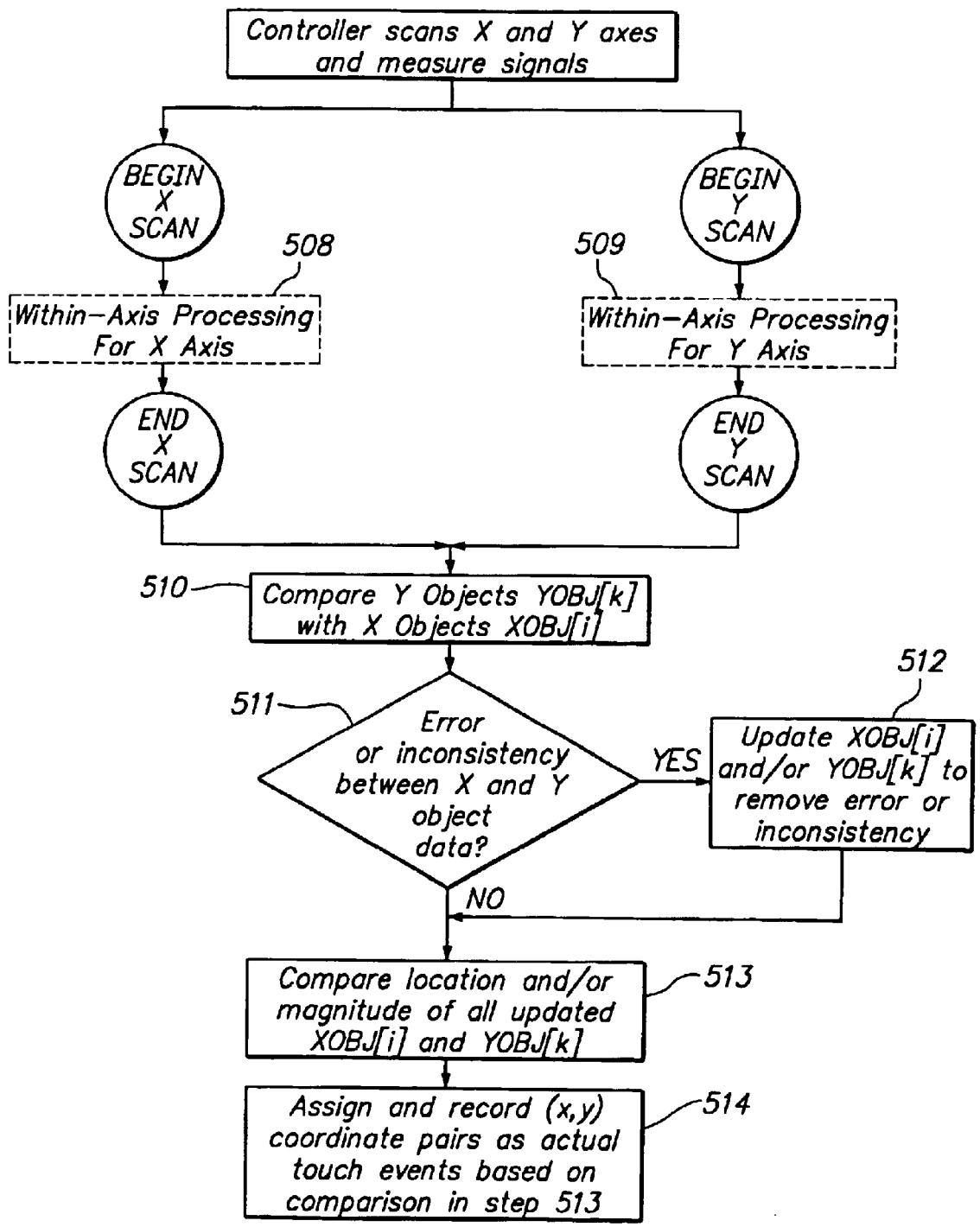
FIG. 6 is a flow chart illustrating a method for analyzing and processing touch point data along two independent axes, and using the processed data to assign coordinates for actual touch points.

Over multiple sampling periods, data processing for both X- and Y- axes builds up an independent sequence of measurement data (i.e., an object) for each X coordinate and each Y coordinate. This is illustrated in FIGS. 5 and 6, where the independent sequences of measurement data for the $i^{th}$ X coordinate and the $k^{th}$ Y coordinate are labeled as XOBJ[i] and YOBJ[k], respectively. The sequences can include data from the most recent sampling period and data extending back in time over several previous sampling periods. Included as elements stored in the sequences are the touch magnitudes for each X coordinate and for each Y coordinate associated with a touch signal.

The flow chart for the method illustrated in FIG. 6 shows that after the independent sequences of X and Y data are built up and updated separately (508 and 509, respectively and shown in detail as steps 300–306 of FIG. 5), they can be further improved by comparing X data sequences with Y data sequences (510), i.e., X objects with Y objects, and more specifically, elements of X objects with elements of Y objects. If the inter-axis comparisons yield important information (e.g., inconsistency), the single axis data can be updated as necessary (512). After all intra- and inter-axis optimization of the X and Y data sequences has been accomplished for the desired number of scans, final comparisons between magnitudes and/or locations are carried out (513), and based on these comparisons, pairings of X and Y coordinates that correspond to actual touch points are determined (514).

If multiple touches briefly cross paths along one axis, the historical data and predictions based on prior information about each touch signal may be sufficient to maintain the uniqueness of their associated software objects. Details of individual but overlapping touch signals may be revealed by using differential sampling techniques. These techniques reference a current signal to a prior signal that is recorded an integral number of scans prior to the current signal. Methods incorporating the use of differential signals are included in copending U.S. patent application Ser. No. 10/389,391, filed Mar. 14, 2003, the disclosure of which is incorporated herein by reference. When a small touch is located near a large touch, the small touch's characteristics may be determined by subtracting the large touch or an approximation of the large touch from the overall signal. For example, the detected signal associated with the larger touch can be reconstructed by modeling the signal as a Gaussian shaped pulse. The Gaussian shaped pulse can then be subtracted from the overall signal.

In a preferred method for processing two or more touch signals corresponding to more than one X coordinate or more than one Y coordinate detected in the same sampling period, the controller can analyze possible (X, Y) pairings that produce the largest correlation between magnitudes of corresponding X and Y coordinates. For example, if touch signals comprising N X coordinates and N Y coordinates arrive within the same sampling period, where N is an integer having a value of 2 or greater, then the controller can establish correlations for N*(N−1) possible pairs of coordinates, and use these correlations to decide which pairings of coordinates correspond to valid touch locations.

The cross correlation r(U,V) between two sequences of numbers U and V each containing N elements is known to be:

$$r(U, V) = \frac{\sum_{i=1}^{N}(u_i - \overline{U}) \cdot (v_i - \overline{V})}{\sqrt{\sum_{i=1}^{N}(u_i - \overline{U})^2 \cdot \sum_{i=1}^{N}(v_i - \overline{V})^2}} \quad \text{where} \quad (1)$$

$$U = \{u_1, u_2, u_3, \ldots, u_N\}$$

$$\overline{U} = \frac{u_1 + u_2 + u_3 + \ldots + u_N}{N}$$

$$V = \{v_1, v_2, v_3, \ldots, v_N\}$$

$$\overline{V} = \frac{v_1 + v_2 + v_3 + \ldots + v_N}{N}.$$

However, square root operations such as that shown in the denominator in Equation 1 can be difficult for microchip controllers. Therefore, instead of the conventional method of calculating a cross-correlation between two sequences of numbers as shown in Equation 1, it may be more preferred to use an alternative equation for calculating a correlation R between two sequences of numbers U and V. An example of one such alternative equation is shown below in Equation 2.

$$R(U, V) = \frac{\sum_{i=1}^{N}(u_i - \overline{U}) \cdot (v_i - \overline{V})}{\left(\frac{\sum_{i=1}^{N}(u_i - \overline{U})^2 + \sum_{i=1}^{N}(v_i - \overline{V})^2}{2}\right)} \quad (2)$$

The correlation value R shown in Equation 2 can be easily calculated by a microchip controller and used as the correlation between two sequences of values. Although the numerical values produced by Equation 2 differ slightly from those of the conventional cross-correlation Equation 1, Equation 2 will delivers substantially the same information for the same sets of numbers.

A number of alternative equations are available for analyzing correlation between two sequences of numbers, and some are more amenable than others to calculation by a microprocessor. Equations for calculating correlation between number sequences fall into several categories. A first category comprises equations like Equations 1 and 2 shown above. In the first category, the correlation value is calculated as a ratio of two quantities—the first quantity being a sum of products of terms comparing corresponding elements of each sequence to suitable references and the second quantity being a normalizing factor that summarizes the magnitude of all elements in both sequences. A second category for calculating correlation between number sequences leverages the similarity between the mathematical meaning of correlation and the distinct mathematical operation known as convolution. In this category, efficient techniques from the field of signal processing may be applied to calculate correlation using transform methods—including, but not limited to, fast Fourier transforms, digital Fourier transforms and Gabor transforms. There are other equations that can not be classified in either of these two categories. However, all such equations serve the purpose of mapping the degree of similarity or difference between number sequences into a numerical score. Here, the term correlation and the associated notation R(U, V) includes the use of and result of any suitable calculating method.

A preferred method for finding optimum pairings of X and Y coordinates and subsequently assigning those pairings as actual touch points based on a correlation value between associated magnitude values can include the following steps. When two or more sets of X and Y coordinates are detected in one sampling cycle, they can be tagged as "ambiguous", in that it is not clear to the system which X and Y coordinates should be paired together to indicate the location of actual touches. As long as they remain tagged as ambiguous, these X and Y coordinates will not generate coordinate reports, i.e., they will not be recognized as valid touches by the system.

After multiple (e.g., at least two and preferably four or more) sampling cycles, the method analyzes the sequences of magnitudes corresponding to the ambiguous X and Y coordinates by calculating a correlation value between the sequence of magnitudes associated with an X coordinate and the sequence of magnitudes associated with a Y coordinate [notated here as R[M(X), M(Y)]] for each potential (X, Y) pairing. For example, if there are two actual touches providing signal at two X coordinates ($X_1$ and $X_2$) and at two Y coordinates ($Y_1$ and $Y_2$) and they are labeled as ambiguous, the method comprises calculating correlation values between the magnitude sequences for the possible pairings of the X and Y coordinates, e.g., R[M(X1), M(Y1)], R[M(X1), M(Y2)], R[M(X2), M(Y1)], and R[M(X2), M(Y2)]. Since only two actual touches occurred, two of these correlation values are expected to be higher than the other two, allowing a decision to be made about which coordinate combinations to label as valid. The method can also include calculating correlation values between magnitude sequences associated with coordinates on the same axis, e.g., R[M($X_1$),M($X_2$)] and R[M($Y_1$),M($Y_2$)].

The method can compare a correlation value between the magnitude sequences associated with the elements of each potential pairing of coordinates against the correlation value for other potential (X, Y) pairs, or against a correlation value calculated between magnitude sequences associated with two X coordinates or two Y coordinates (e.g., R[M($X_1$),M($X_2$)], R[M($Y_1$),M($Y_2$)], etc.), or against a reference value. The reference value can be for example, a constant, a correlation value for a specified (X, Y) pair, or a correlation value for a specified (X, X) pair or a specified (Y, Y) pair. In addition, the method can compare a correlation value between the magnitude sequences associated with the elements of each potential (X, Y) pair against the correlation values for other pairs multiplied by a safety factor. Some examples of comparisons that can be made are as follows:

$$R[M(X_1),M(Y_1)] > K_1 \cdot R[M(X_1),M(Y_2)]$$

$$R[M(X_1),M(Y_1)] > K_1 \cdot R[M(X_2),M(Y_1)]$$

$$R[M(X_1),M(Y_1)] > K_2 \cdot R[M(X_1),M(X_2)]$$

$$R[M(X_1),M(Y_1)] > K_2 \cdot R[M(Y_1),M(Y_2)]$$

where K1 and K2 are safety factors. Although the safety factor shown in the above example is shown to be the same for comparison between correlation values for possible (X, Y) pairs, different safety factors may be used. In addition, although the same safety factor is used for comparison of the correlation value between an (X, Y) pair and that of (X, X) and (Y, Y) pairs, different factors may be used. K values are typically greater than 1. The K values may be set up to have the same values for certain types of comparisons, as shown above, or they may be set to custom values for specific situations.

If calculating and comparing the correlations as described above produce a clear choice for the best pairings, then the method includes removing the ambiguous tag from those coordinates determined to show the best pairings and producing coordinate reports for the pairings, and thereby recognizing and processing them as valid touches.

However, if calculating and comparing the correlations as described above do not produce a clear choice for the best pairings, then the method includes collecting more data and calculating further correlations incorporating the additional information.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

It will be understood that the above-described arrangements of apparatus are merely illustrative of applications of the principles of this invention and many other embodiments and modifications may be made without departing from the spirit and scope of the invention as defined in the claims.

What is claimed is:

1. A method for identifying locations of two or more touch inputs to a sensor substrate in a touchscreen system wherein the touch inputs overlap in time, the substrate having an X axis comprising X coordinates and a Y axis comprising Y coordinates, comprising the steps of:
    (a) repeatedly measuring signals indicative of the locations of the two or more touch inputs, the locations having X and Y coordinates and the signals having associated X and Y magnitudes;
    (b) for each X coordinate, storing the associated X magnitude measured for each repeated measurement as elements in an X object;
    (c) for each Y coordinate, storing the associated Y magnitude measured for each repeated measurement as elements in a Y object;
    (d) for possible pairings of X and Y coordinates, comparing elements of associated X objects with corresponding elements of associated Y objects; and
    (e) selecting pairings of X and Y coordinates corresponding to locations of actual touch inputs based on the comparison of step (d).

2. The method of claim 1, wherein step (d) further comprises calculating a correlation between elements of X objects and elements of Y objects associated with possible pairings of X and Y coordinates for comparing the elements.

3. The method of claim 2, wherein:
    an element of the X object comprises a magnitude M(X) associated with an X coordinate;
    an element of the Y object comprises a magnitude M(Y) associated with a Y coordinate; and
    a correlation R[M(X),M(Y)] between magnitudes of the X object and an magnitudes of the Y object is calculated.

4. The method of claim 3, wherein R[M(X),M(Y)] is calculated using the formula:

$$R[M(X), M(Y)] = \frac{(M(X) - \overline{M(X)}) \cdot (M(Y) - \overline{M(Y)})}{\left( \frac{(M(X) - \overline{M(X)})^2 + (M(Y) - \overline{M(Y)})^2}{2} \right)};$$

wherein $\overline{M(X)}$ represents the arithmetic average of the magnitudes in the X object and $\overline{M(Y)}$ represents the arithmetic average of the magnitudes in the Y object.

5. The method of claim 1, further comprising the steps of:
    (f) comparing each X object with other X objects and updating the elements of the X objects to produce a more accurate representation of touch activity on the X axis; and
    (g) comparing each Y object with other Y objects and updating the elements of the Y object to produce a more accurate representation of touch activity on the Y axis;
    wherein steps (f) and (g) are performed before steps (d) and (e).

6. The method of claim 5, wherein the updating of the elements in each X object in step (f) comprises subtracting a magnitude previously measured for an X coordinate from a current magnitude for the X coordinate.

7. The method of claim 5, wherein the updating of the elements in each Y object in step (g) comprises subtracting a magnitude previously measured for a Y coordinate from a current magnitude for the Y coordinate.

8. The method of claim 5, wherein the updating of the elements of the objects in step (f) or step (g) comprises approximating a magnitude for one of the touch inputs measured over distance as a functional form, and subtracting the approximated functional form from the magnitudes measured for all touch inputs.

9. The method of claim 8, wherein the functional form comprises a Gaussian pulse shape.

10. A touch input system, comprising:

a touch point sensor comprising an X axis and a Y axis, wherein a pair of coordinates composed of one X coordinate and one Y coordinate defines a location; and a location determining apparatus for determining the locations of touch points comprising:

detecting means for repeatedly detecting touch signals corresponding to X and Y coordinates and associated X and Y signal magnitudes caused by two or more touch points overlapping in a time period;

storing means for storing the X signal magnitudes corresponding to each X coordinate of the touch locations as elements in an X object, and for storing the Y signal magnitudes corresponding to each Y coordinate of the touch locations as elements in a Y object, wherein one object is associated with one coordinate;

first comparison means for comparing elements of X objects to elements of Y objects associated with possible pairings of X and Y coordinates; and selection means for selecting pairings of X and Y coordinates corresponding to actual touch point locations based on the comparison between elements of the X objects and elements of the Y objects associated with the pairings.

11. The touch input system of claim 10, comprising a second comparison means for comparing each X object with other X objects and each Y object with other Y objects and updating their elements to ensure consistency between objects associated with each axis.

12. The touch input system of claim 10, wherein the detecting means comprises separate channels for detecting X signals and Y signals.

13. The touch input system of claim 10, wherein the time period corresponds to the time period between the repeated detections of touch signals.

14. The touch input system of claim 10, wherein the comparison means for comparing elements of X objects to elements of Y objects calculates a correlation value between X magnitudes associated with an X coordinate and a Y magnitudes associated with a Y coordinate, and the selection means for selecting pairings of X and Y coordinates corresponding to actual touch point locations uses the correlation value.

15. The touch input system of claim 14, wherein the selection means for selecting pairings of X and Y coordinates corresponding to actual touch point locations compares the correlation value to a reference value.

16. The touch input system of claim 15, wherein the reference value corresponds to the correlation value for a specified (X, Y) coordinate pair.

17. The touch input system of claim 15, wherein the reference value corresponds to a correlation value for a specified (X, X) or (Y, Y) coordinate pair.

18. The touch input system of claim 14, wherein a correlation between the magnitudes M(X) associated with an X coordinate and the magnitudes M(Y) associated with a Y coordinate is calculated as R[M(X),M(Y)] using the formula:

$$R[(M(X), M(Y)] = \frac{(M(X) - \overline{M(X)}) \cdot (M(Y) - \overline{M(Y)})}{\left(\frac{(M(X) - \overline{M(X)})^2 + (M(Y) - \overline{M(Y)})^2}{2}\right)};$$

wherein $\overline{M(X)}$ represents the arithmetic average of the magnitudes associated with the X coordinate and $\overline{M(Y)}$ represents the arithmetic average of the magnitudes associated with the Y coordinate.

19. The touch input system of claim 10, wherein the comparison means for comparing elements of X objects to elements of Y objects calculates a correlation value between X magnitudes associated with an X coordinate and Y magnitudes associated with a Y coordinate for all possible pairings of X and Y coordinates, and the selection means for selecting pairings of X and Y coordinates corresponding to actual touch point locations compares the correlation values for all possible pairings.

20. The touch input system of claim 19, wherein the comparison means further multiplies one or more correlation values by a safety factor.

21. The touch input system of claim 20, wherein the safety factor is greater than one.

22. A system comprising:

a touch panel input device comprising a touch panel sensor having an X axis and a Y axis for indicating actual touch point locations on the sensor;

a signal detector operating for a succession of time intervals to detect an X signal comprising an X magnitude representative of an associated X coordinate and a Y signal comprising a Y magnitude representative of an associated Y coordinate for each actual touch point on the sensor, wherein more than one X signal or more than one Y signal are detected during a single time interval; and a selector for processing the X signals and the Y signals separately from each other to select pairs of coordinates corresponding to locations of actual touch points, wherein the selector selects the pairs of coordinates based on a correlation value between X magnitudes associated with the X coordinate of the pair and Y magnitudes associated with the Y coordinate of the pair.

23. The system of claim 22, wherein the signal detector comprises a reflector array that acts upon acoustic waves propagating along the touch panel sensor and reflects the waves at sides of the sensor and a transducer for detecting the reflected waves, and wherein the magnitudes correspond to the amplitudes of the reflected waves and the coordinates correspond to times at which the reflected waves are detected.

24. The system of claim 22, wherein the selector comprises a controller that calculates the correlation.

25. The system of claim 22, wherein the selector compares the correlation between the X magnitudes and the Y magnitudes for a coordinate pair to a reference value to decide whether the coordinate pair corresponds to an actual touch point location.

26. The system of claim 22, wherein the selector compares the correlation between the X magnitudes and the Y magnitudes for a coordinate pair to correlation values between the X magnitudes and the Y magnitudes for other coordinate pairs to decide whether the coordinate pair corresponds to an actual touch point location.

* * * * *